Figure 1:
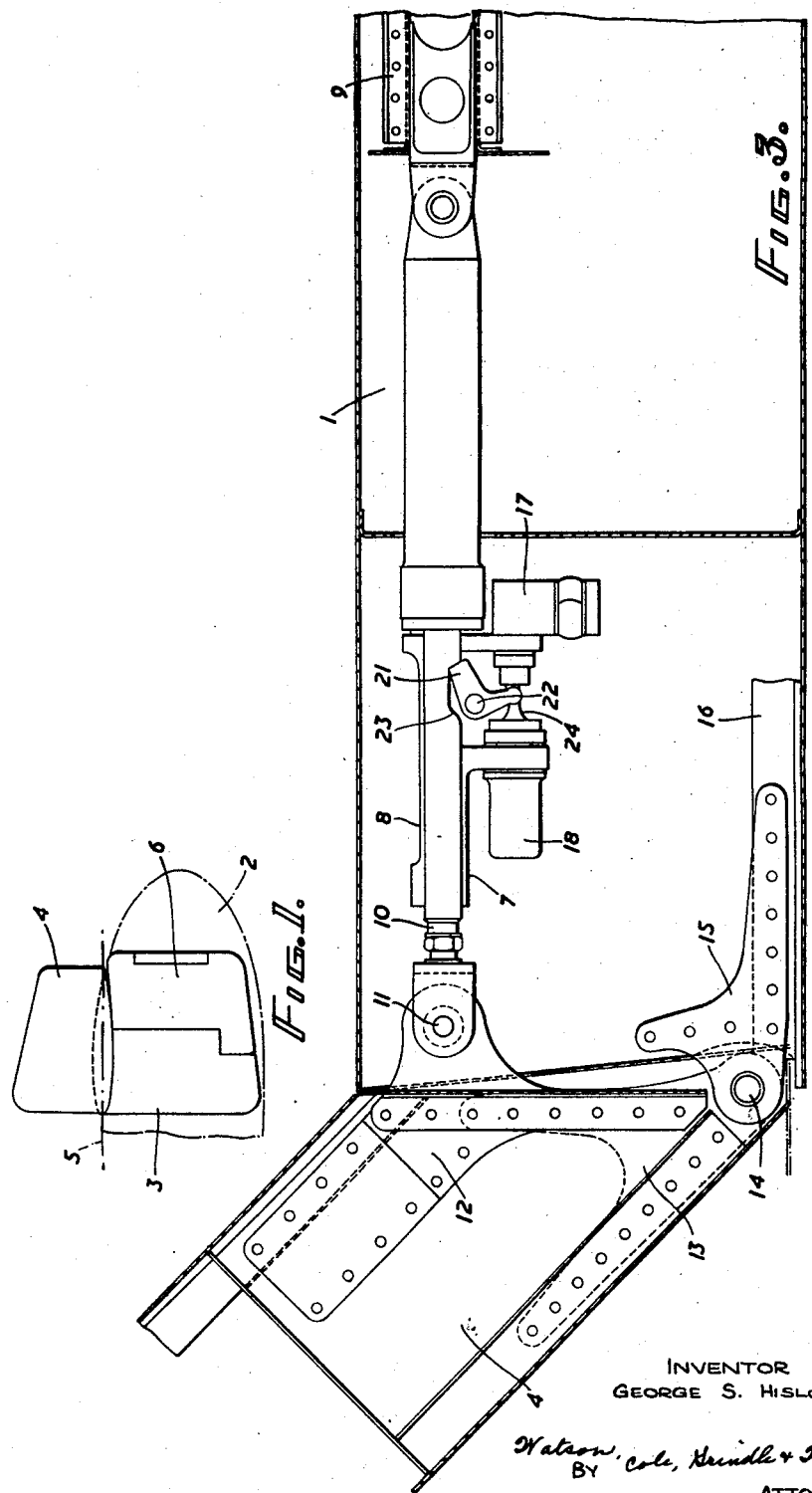

June 14, 1960     G. S. HISLOP     2,940,693
AIRCRAFT FINS

Filed Sept. 19, 1955     2 Sheets-Sheet 1

INVENTOR
GEORGE S. HISLOP

BY Watson, Cole, Grindle & Watson
ATTORNEY

June 14, 1960     G. S. HISLOP     2,940,693
AIRCRAFT FINS

Filed Sept. 19, 1955     2 Sheets-Sheet 2

INVENTOR
GEORGE S. HISLOP.

BY Watson, Cole, Grindle+Watson

ATTORNEY

United States Patent Office 2,940,693
Patented June 14, 1960

2,940,693
AIRCRAFT FINS

George Steedman Hislop, Hayes, England, assignor to Fairey Aviation Limited, Hayes, England, a company of Great Britain Filed Sept. 19, 1955, Ser. No. 535,072

Claim priority, application Great Britain Sept. 20, 1954

4 Claims. (Cl. 244—17.11)

This invention relates to aircraft fins. It is the function of a fin to provide the aircraft with some stability about a vertical axis which is known as "weathercock" stability and depends, amongst other things, on the position of the centre of gravity of the aircraft, the position of the centre of lateral pressure, the aircraft speed and the fin area. In this specification the terms "vertical" and "horizontal" are used with reference to an aircraft assuming that the aircraft is in level flight.

According to one aspect of the present invention in an aircraft having a helicopter rotor and a fin which can foul the sweep path of the rotor blades when they are only just rotating but not when they are rotating at a certain greater speed, the fin or a portion of it is movable to a position such that no part of the fin fouls the sweep path when the rotor is only just rotating.

In cases where a fin can foul the ground when the aircraft is standing on its undercarriage, the fin or a portion of it may be movable to a position in which no part of the fin fouls the ground when the aircraft is standing on its undercarriage.

The invention is particularly, though not exclusively, applicable to aircraft of the type provided with a rotary wing in addition to stub wings, and power units exerting a forward thrust. With such aircraft for normal flight the pitch of the rotary wing is reduced and the forward thrust units are relied on for forward propulsion. In these circumstances fins are required as in a conventional aircraft. On the other hand when accelerating the rotor up to speed on the ground, or when rising vertically or hovering, the fins are not required to the same extent, or at all. In general an aircraft of this type is designed to be fairly low on the ground and when the rotor blades are at rest and are in consequence deflected in their lowest position the vertical space between them and the ground will be limited, and may not allow space for adequate fins.

This difficulty may be met by means of the present invention.

The fin may either be positioned so that it does not foul the ground but has its top portion movable out of the sweep path of the rotor blades or it may be positioned so low that its top is not in the sweep path of the rotor blades when they are only just rotating and its lower portion is movable clear of the ground.

It may be arranged that movement of the fin or a portion of it can take place when the aircraft is in flight and the mechanism for moving it may be interlocked with a retractable undercarriage, so that it is out of the vertical whenever the undercarriage is down.

According to another aspect of the invention an aircraft has an aerofoil at the tail movable whilst the aircraft is in flight about a generally fore-and-aft axis whereby the effective fin area can be increased or decreased at the expense of a decrease or increase in the effective tail plane area without corresponding movement of any movable control surface, for example a rudder or elevator.

It may be that as the position of the centre of gravity of the aircraft changes due to consumption of fuel or a change in the load distribution or if one of the engines fails, it becomes necessary to increase or decrease the fin area and if the aerofoil is normally in a position between that in which it acts solely as a fin and that in which it acts solely as a tail plane, it can be moved towards or away from the vertical. The aerofoil may be moved in the same way if it is desired to increase or decrease the effective tail plane area. This movement can be made without affecting the operation of the rudder.

In one form of the invention the fin is in a plane through the end of and perpendicular to the aircraft's tail plane with a portion above and a portion below the tail plane one only of which comprises the aerofoil and is pivotable into a position in which it forms an extension of the tail plane. The rudder may be pivoted to the immovable portion of the fin.

Figure 2:
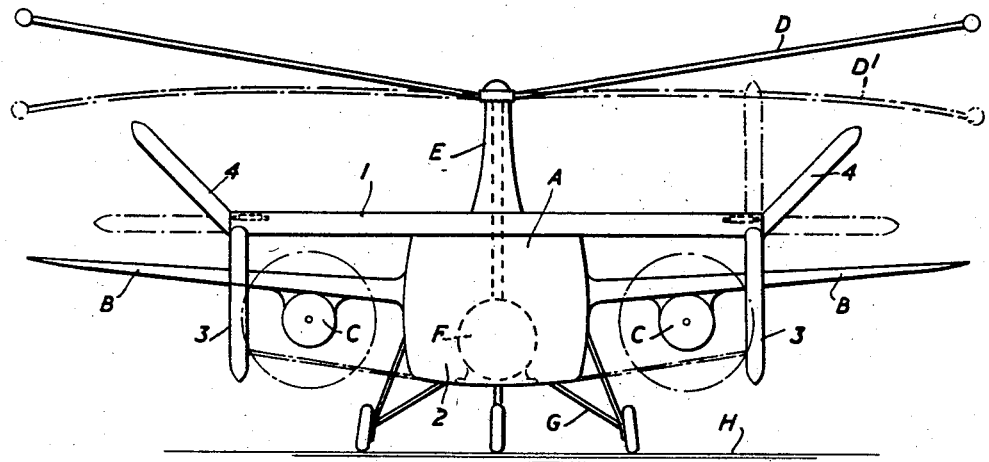
Figure 4:
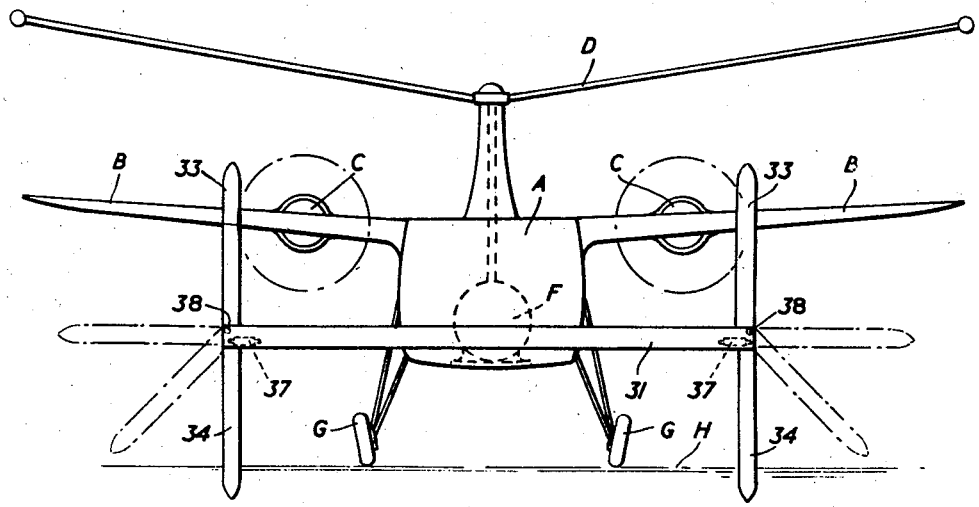

The invention may be carried into practice in different ways but one specific embodiment will be described by way of example with reference to the accompanying drawings, in which:

Figure 1 is a side view of the tail portion of the aircraft shown in Figure 2;

Figure 2 is a rear end view of an aircraft having a helicopter rotor and two fore-and-aft axis propeller-turbine units on stub wings in which two fins on either side of the fuselage are arranged in accordance with a preferred embodiment of the invention, Figure 3 is a fragmentary sectional view on a larger scale illustrating part of the port side of the tail of the aircraft shown in Figure 2, Figure 4 is a view similar to Figure 2 of a modified embodiment of the invention.

The aircraft shown in Figure 2 has a fuselage A, stub wings B secured to the fuselage and carrying two propeller-turbine propulsion units C mounted one on either side of the fuselage to deliver a propulsive thrust parallel to the fore-and-aft axis of the aircraft. A helicopter rotor D is mounted on a pylon E on the fuselage and is driven by engine means indicated diagrammatically at F within the fuselage. The fuselage is also provided with a retractable undercarriage G on which it can rest on the ground, the plane of contact of the undercarriage with the ground being indicated at H.

The tail of the aircraft comprises a fixed tail plane 1 extending over the top of the rear end of the fuselage 2 on either side with a fin at each end of the tail plane comprising a fixed portion 3 extending below the tail plane for about the depth of the fuselage, and a movable portion 4 pivotally mounted at the end of the tail plane about a generally fore-and-aft axis 5 between the position shown in solid lines and the position shown in chain lines where it forms a horizontal extension of the tail plane 1. A rudder 6 is pivotally mounted aft of the fixed portion 3 of the fin.

The mechanism for moving the movable portion 4 of the fin is shown in Figure 3 and comprises a hydraulic actuator 7 of which the cylinder 8 is secured to a web 9 in the tail plane and the rod 10 is pivotally connected at 11 to a bracket 12 secured to the structure of the movable portion 4 of the fin. A second bracket 13 also secured to the structure of the portion 14 is pivoted at 14 to a bracket 15 secured to a spar 16 extending along the lower surface of the tail plane 1. The movable portion 4 of the fin is shown only diagrammatically, while the fixed portion 3 is not shown in Figure 3.

The actuator 7 is operated by fluid from a reservoir 17 pumped by an electric motor 18 to one end or other of the cylinder 8. A rocking detent 21 pivoted at 22 to the structure of the tail plane and engaging in a notch 23 in the actuator cylinder serves the dual purpose of providing a lock for the actuator in either of its extreme positions and of operating a valve 24 to determine to which end of the cylinder the operating fluid is supplied.

When the pilot wishes to raise or lower the movable portion 4 of the fin he has only to press a button energising the motor 18 which causes pressure fluid to be supplied to the appropriate end of the cylinder to move the actuator into its other position; during this movement the rocking detent 21 will be rocked into its other position to lock the actuator in the new position and change over the valve 24. When the actuator is in the position shown in Figure 3 and is operated, the movable portion 4 will move by pivoting about 14 until it forms an extension of the tail plane 1.

When the aircraft is landing and taking-off it is desirable to have as great an effective tail plane area as possible but since the fore-and-aft propellor turbine units will be producing little if any thrust, the necessary effective fin area is not as great as when the aircraft is flying horizontally using the fore-and-aft axis units. Thus the movable portion 4 may be lowered into the horizontal position. However when the aircraft has reached its desired altitude and horizontal flight is commenced, it will be necessary to have a greater fin area and the movable portion 4 will be raised to the position shown in solid lines in Figure 2 to increase the effective fin area at the cost of a decrease in the effective tail plane area.

It may be desirable to provide for a further increase in the effective fin area and, as shown with respect to the starboard fin in Figure 2, the movable portion 4 can be moved into the vertical plane containing the fixed portion 3.

It may be that when in this position the movable portion of the fin will foul the sweep path of the rotor blades unless they are rotating at a speed greater than a certain minimum. When the aircraft is in horizontal flight, or when it is on the ground, the rotor may be auto-rotating or may be idling, and in either case the rotation may be so slow that the blades would foul the movable portions 4 of the fins, as indicated in broken lines at D1 and accordingly in such a condition the pilot could lower the movable portions sufficiently to clear the slow speed sweep path of the rotor.

Where the aircraft has a retractable undercarriage the movable portions 4 could be interlocked with the undercarriage in such a manner that they would always be clear of the slow speed sweep path of the rotor blades when the undercarriage was down.

Of course the problem of fouling the rotor blades by the fins could be overcome by having the fins lower in relation to the fuselage, but it might then be necessary, if there were to be sufficient fin area, for the fins to project below the fuselage in which position they would foul the ground when the aircraft landed. Accordingly the lower portion of the fins may be made movable to a position in which they would not foul the ground when the aircraft was on the ground. Thus in the further embodiment illustrated in Figure 4, in which similar parts are given the same references as in Figures 1 to 3, the tail plane 31 comprising the main member of the tail unit is mounted lower in relation to the fuselage A at its end than in the embodiment of Figures 1 to 3, and the fixed portions 33 of the fin extend upwardly at each end of the tail plane 31 instead of downwardly as in the preceding embodiment. Since the tail plane 31 is lower, the tops of the fixed portions 33 of the fins are below the lowest sweep path of the blades of the rotor D. However, the movable portions 34 of the fins, which are hinged to the ends of the tail plane 31 and extend downwardly, project below the plane of contact H of the undercarriage G with the ground and consequently would foul the ground when the aircraft was standing on its undercarriage if the movable fin portions 34 remain projecting vertically downwards at right angles to the tail plane 31. Accordingly the movable portions 34 are arranged to be swung upwardly to the dotted line positions indicated by pivoting about the ends of the tail plane, so that the movable fin portions are clear of the ground. For this purpose, each end of the tail plane 31 contains a hydraulic actuator and associated mechanism indicated diagrammatically at 37, for moving the portions 34 of the fin about their hinged axes 38 and for locking them in the selected positions. The actuator mechanism 37 and its associated parts are precisely similar to those illustrated in Figure 3 but are arranged in the inverted position in the tail plane 31 as compared with the mechanism 7 of Figure 3 and need not be further illustrated. As indicated, the movable fin portions 34 may be moved into horizontal positions in which they constitute extensions to the ends of the horizontal tail plane 31, or to intermediate positions in which they are inclined to the horizontal.

What I claim as my invention and desire to secure by Letters Patent is:

1. An aircraft having a fuselage and a helicopter rotor mounted on the fuselage for rotation about a generally vertical axis, the rotor including radial blades spaced above the fuselage which flex in the generally vertical direction under the varying loads imposed on them in use, engine means arranged to drive the rotor to provide vertical lift, a tail plane fixed on and extending across the fuselage in a plane above the fuselage but below said rotor blades in the lowest sweep path followed by said blades at their maximum downward deflection, fins respectively hinged to the opposite transverse ends of said tail plane for angular vertical movement about fore and aft extending horizontal axes, between horizontal positions wherein they are both aligned with and constitute extensions of said tail plane, and generally vertical positions, the vertical dimensions of said fins in their said vertical positions being greater than the distance from said tail plane to said lowermost sweep path of the blades, but less than the distance from said tail plane to the sweep path followed by said blades when rotating in normal flight, and means for moving each fin between the said upper and lower extreme positions.

2. An aircraft as defined in claim 1, including additional fins rigidly affixed to opposite transverse ends of the tail plane and depending vertically downwardly therefrom, said first-mentioned fins in their generally vertical positions being respectively aligned with and constituting extensions of the additional fins.

3. An aircraft having a fuselage, fixed wings secured to the fuselage, and a power-driven helicopter rotor mounted on the fuselage for rotation about a generally vertical axis, the rotor including radial blades spaced above the fuselage which flex in the vertical direction under the varying loads imposed on them in use, a power unit exerting a forward thrust on the aircraft, a tail plane fixed on and extending across the fuselage in a plane above the fuselage but below said rotor blades in the lowest sweep path followed by said blades at their maximum downward deflection, fins respectively hinged to the opposite transverse ends of said tail plane for angular vertical movement about fore and aft extending horizontal axes, between horizontal positions wherein they are both aligned with and constitute extensions of said tail plane, and generally vertical positions, the vertical dimensions of said fins in their said vertical positions being greater than the distance from said tail plane to said lowermost sweep path of the blades, but less than the distance from said tail plane to the sweep path followed by said blades when rotating in normal flight, and means for moving each fin between the said upper and lower extreme positions.

4. An aircraft as claimed in claim 3 in which the aircraft includes a rudder and the said means for moving the fin between its upper and lower extreme positions includes a manual control member operable by the pilot to move the fin without affecting the operation of the rudder while the aircraft is in flight.

References Cited in the file of this patent

UNITED STATES PATENTS

| | | |
|---|---|---|
| 2,076,283 | Teisseyre | Apr. 6, 1937 |
| 2,098,230 | Cierva | Nov. 9, 1937 |
| 2,653,778 | Bennett et al. | Sept. 29, 1953 |
| 2,665,859 | Papadakos | Jan. 12, 1954 |

FOREIGN PATENTS

| | | |
|---|---|---|
| 347,779 | Great Britain | May 7, 1931 |
| 576,125 | Great Britain | Mar. 20, 1946 |
| 839,422 | France | Jan. 4, 1939 |